US005398800A

United States Patent [19]

Hofling et al.

[11] Patent Number: 5,398,800

[45] Date of Patent: Mar. 21, 1995

[54] SAFETY DEVICE FOR A PEOPLE MOVER

[75] Inventors: Peter Hofling, Dortmund; Klaus Schoneweiss, Hattingen; Alfred Thiel, Sprockhövel, all of

[73] Assignee: O&K Rolltreppen GmbH, Hattingen, Germany

[21] Appl. No.: 231,767

[22] Filed: Apr. 25, 1994

[30] Foreign Application Priority Data

Apr. 23, 1993 [DE] Germany ........................ 43 13 313.4

[51] Int. Cl.⁶ ................................................ B65G 43/00

[52] U.S. Cl. ...................................................... 198/323

[58] Field of Search ................................ 198/323, 325

[56] References Cited

U.S. PATENT DOCUMENTS

| | | | |
|---|---|---|---|
| 2,030,103 | 2/1936 | Dunlop | 198/323 |
| 2,109,210 | 2/1938 | Dunlop | 198/323 |
| 3,132,733 | 5/1964 | Boman et al. | 198/323 |
| 4,088,219 | 5/1978 | Binns | 198/323 |
| 4,476,971 | 10/1984 | Schoneweiss | 198/323 |

FOREIGN PATENT DOCUMENTS

| | | | |
|---|---|---|---|
| 2627969 | 1/1977 | Germany . | |
| 372667 | 11/1983 | Germany . | |
| 374169 | 2/1964 | Switzerland . | |
| 1159589 | 7/1969 | United Kingdom | 198/323 |
| 1373665 | 2/1988 | U.S.S.R. | 198/323 |

*Primary Examiner*—James R. Bidwell

*Attorney, Agent, or Firm*—Spencer, Frank & Schneider

[57] ABSTRACT

A safety device for people movers, particularly for escalators and moving sidewalks, includes at least one carrier plate supporting a comb segment at a first end. The carrier plate is horizontally displaceable relative to at least one carrier element which accommodates the carrier plate, and is pivotable about a horizontal rotational axis which is located at a second end of the carrier plate and cooperates with at least one switch-off device for immobilizing the people mover.

10 Claims, 1 Drawing Sheet

SAFETY DEVICE FOR A PEOPLE MOVER

CROSS-REFERENCE TO RELATED APPLICATION

The present application claims the right of foreign priority with respect to Application No. P 43 13 313.4 filed in Germany on Apr. 23, 1993, the subject matter of which is incorporated herein by reference.

BACKGROUND OF INVENTION

1. Field of the Invention

The present invention relates to a safety device for people movers. More particularly, the present invention relates to a safety device for escalators and moving sidewalks.

2. Description of the Related Art

Previously known safety devices for people movers are no longer considered optimal, particularly with respect to meeting requirements (which are constantly becoming stricter) for improving people movers such as escalators and moving sidewalks. Since vertical forces in addition to horizontal forces occur in the region of the comb segment and the carrier plate, and different sensitivities for the horizontal and vertical forces are required for causing an emergency shut off, and an improvement of previously known safety devices for people movers is needed.

SUMMARY OF THE INVENTION

It is the object of the invention to provide a device for people movers, such as escalators and moving sidewalks, such that with a simple construction the safety of the people who use people movers can be guaranteed in an optimal manner.

This and other objects are provided by a safety device for people movers which includes at least one carrier plate accommodated by a carrier element such that the carrier plate is horizontally displaceable with respect to the carrier element, and a comb segment supported by the carrier plate at a first end of the carrier plate, wherein the carrier plate is pivotably displaceable about a first rotational axis and cooperating with at least one switch-off device for immobilizing the people mover.

Preferably, the carrier element, configured as a roller carrier, is provided below the carrier plate, and equipped with at least two rollers for horizontally displacement of the carrier plate. The at least one switch-off device is preferably located between carrier plate and the carrier element and between the two rollers.

According to the invention, the first rotational axis is at a second end of the carrier plate which is opposite the first end of the carrier plate. Further, the comb segments are pivotable about a second rotational axis which is formed by an oval head screw.

The present invention also provides at least one pressure responsive tube extending over a width of the comb segments between the carrier plate and the comb segments so that the people mover is turned off if the comb segments are rotated around the second rotational axis thus changing a pressure within the pressure responsive tube. Preferably, the pressure responsive tube is located between the first and second rotational axes.

Additionally, the present invention includes a lever having a first end and a second end such that the first end of the lever is coupled to the carrier plate and the second end of the lever is coupled to a turn-off switch of the switch-off device through a switching rod having a predetermined tension so that the switch-off device is turned off if the carrier plate is displaced horizontally or pivotably to produce a force exceeding the predetermined tension.

The invention thus allows for people movers having two switch-off possibilities which are independent from one another and which, depending on system requirements, may be used individually or in combination. On the one hand, a switch-off device is provided in the region of the carrier plate between the rollers and the roller carrier that accommodate the rollers. This switch-off device is activated by a lever rod-assembly which responds to both vertical forces and horizontal forces that influence the carrier plate. On the other hand, in the region between the individual comb segments and the end region of the carrier plate which accommodates the individual comb segments, a pressure responsive tube is provided, wherein, due to the pivotability of the individual comb segments, for example, about the head of an oval head screw, a pressure wave force is produced inside the pressure responsive tube which may also trigger an emergency switch-off of the drive of the people mover.

BRIEF DESCRIPTION OF THE DRAWINGS

An embodiment of the subject matter of the invention is shown in the drawing figures and is described in the Figure drawings in which.

DETAILED DESCRIPTION OF THE PREFERRED EMBODIMENT

Figure 1:
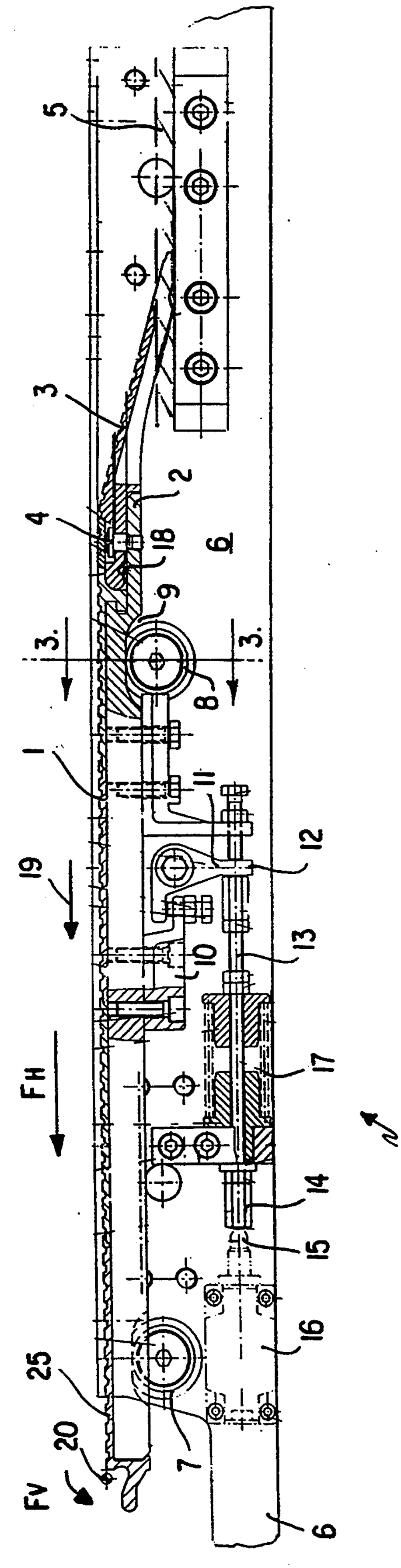
FIG. 1 is a partial sectional side elevational view of a carrier plate accommodating a comb segment and including the switch off device according to the present invention.

FIG. 1 shows a carrier plate 1 of a non-illustrated people mover. Carrier plate 1 is equipped in end region 2 with a plurality of comb segments 3 which are arranged over the width of carrier plate 1 and which are screwed to end region 2 by screws 4. Comb segments 3 cooperate with steps or pallets 5 which are guided underneath comb segments 3. A carrier element 6, which is configured as a roller carrier and provided with spaced rollers 7 and 8, is arranged on each side below carrier plate 1. Corresponding recesses 9, of which only one is shown, are set into carrier plate 1 and engage roller 8. A switch-off device 26 is provided between rollers 7 and 8. A component 10, onto which a lever 11 is mounted, is screwed to carrier plate 1. A free end 12 of lever 11 is fastened to a switching rod 13 which is guided along the length of roller carrier 6. A free end of switching rod 13 cooperates with sensor button 15 at an end switch 16. Switching rod 13 is tensioned by a pressure spring 17 at a predetermined pressure value.

A pressure responsive tube 18, which essentially runs over the entire width of comb carrier 3, extends between comb segments 3 and end region 2 of carrier plate 1 which accommodates comb segments 3. Pressure responsive tube 18 is a more sensitively responding safety member than switch-off device 26. The forces possibly occurring at carrier plate 1 and at comb segments 3, are shown by horizontal and rotational arrows and designated by the symbols $F_H$ and $F_V$, respectively. Carrier plate 1, which is connected to comb segments 3, is horizontally displaced in the direction of the arrow 19 as a function of a horizontal force. This causes lever 11 to be displaced horizontally in parallel with carrier plate 1. Sensor 15 thus actuates end switch 16 via switching rod 13. If vertical forces are applied from below carrier plate 1, carrier plate 1 is slightly pivoted about rotational axis 20 which is disposed in an end region of carrier plate 1, also causing a displacement of the lever 11 and the corresponding activation of end switch 16.

Figure 2:
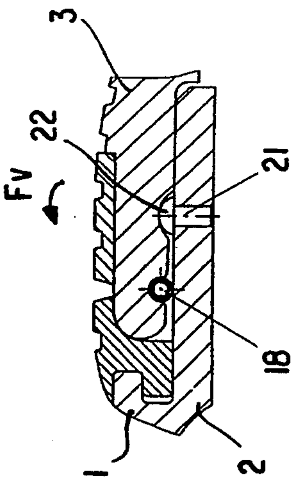
FIG. 2 is an enlarged sectional view through the contact region of the carrier plate on the associated roller carrier according to the invention.

If more sensitive vertical forces occur directly in the region of comb segment 3, one or more comb segments 3 are pivoted about an axis shown in FIG. 2, and the pressure responsive tube 18 is activated, which in turn leads to an emergency switch-off of the drive of the people mover.

FIG. 2 is an enlarged longitudinal view of end region 2 of carrier plate 1 where comb segments 3 are fastened. Pressure responsive tube 18 and rotational point 22 for an individual comb segment 3, formed by an oval head screw 21, are shown in FIG. 2. With the vertical force component shown, one or more comb segments 3 are slightly pivoted about rotational point 22, leading to a change in air pressure in pressure responsive tube 18, triggering the emergency switch-off of the drive on the people mover.

Figure 3:
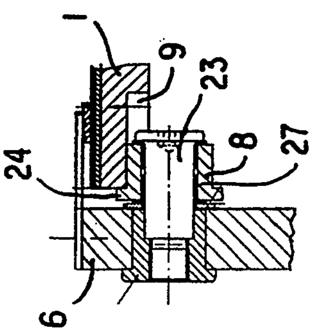
FIG. 3 is a sectional view taken at Section III—III of FIG. 1 through the contact region of the carrier plate on the associated roller carrier according to the invention.

FIG. 3 is a sectional view through the supporting region of the carrier plate 1 on the associated roller carrier 6 taken along line 3—3 in FIG. 2. Roller 8 is mounted on a slide or roller bearing 27 and extends between bolt 23 connected to roller carrier 6 and recess 9 in carrier plate 1. The lateral guidance of the carrier plate 1, in this case, is brought about by the radial projections 24 on roller 8.

The foregoing is a complete description of the present invention. The scope of the invention should only be limited by the following claims.

What is claimed is:

1. A safety device for a people mover, comprising:

a carrier element;

a carrier plate accommodated by said carrier element and being horizontally displaceable with respect to said carrier element;

a comb segment supported by the carrier plate at an end of the carrier plate; the carrier plate being pivotably displaceable about a first rotational axis situated externally of said comb segment; the comb segment being pivotable about a second rotational axis; and a switch-off device operatively connected to said carrier plate for immobilizing the people mover as a function of displacements of said carrier plate.

2. The safety device according to claim 1, wherein the carrier element is provided below the carrier plate, the carrier element including roller means for horizontally displacing the carrier plate.

3. The safety device according to claim 1, wherein the carrier element is configured as a roller carrier.

4. The safety device according to claim 3, wherein the roller carrier includes at least two rollers.

5. The safety device according to claim 1, wherein said end of the carrier plate is a first end; further wherein said first rotational axis is at a second end of the carrier plate, the second end being opposite the first end of the carrier plate.

6. The safety device according to claim 1, wherein the second rotational axis is formed by an oval head screw.

7. The safety device according to claim 1, further comprising at least one pressure responsive tube extending over a width of the comb segment between the carrier plate and the comb segment, the people mover being turned off if the comb segment is rotated around the second rotational axis to change a pressure within the pressure responsive tube.

8. The safety device according to claim 7, wherein the pressure responsive tube is located between the first and second rotational axes.

9. A safety device according to claim 4, wherein the switch-off device is located between the carrier plate and the carrier element and between the two rollers.

10. A safety device according to claim 1, further comprising a lever having a first end and a second end, the first end of the lever being coupled to the carrier plate and the second end of the lever being coupled to a turn-off switch of the switch-off device through a switching rod having a predetermined tension, the switch-off device being turned off if the carrier plate is displaced horizontally or pivotably to produce a force exceeding the predetermined tension.

* * * * *

UNITED STATES PATENT AND TRADEMARK OFFICE
CERTIFICATE OF CORRECTION

PATENT NO. : 5,398,800
DATED : March 21, 1995
INVENTOR(S) : Peter Höfling et al

It is certified that error appears in the above-indentified patent and that said Letters Patent is hereby corrected as shown below:

On the title page, item [75], in the first line, the first inventor's last name should read --Höfling--;

in the second line, the second inventor's last name should read --Schöneweiss--; and the third line should read --Sprockhövel, all of Germany--.

Signed and Sealed this

Twenty-third Day of May, 1995

Attest:

Bruce Lehman

BRUCE LEHMAN

*Attesting Officer*

*Commissioner of Patents and Trademarks*